United States Patent
Belezko et al.

(10) Patent No.: US 11,741,070 B2
(45) Date of Patent: Aug. 29, 2023

(54) SYSTEM AND METHOD FOR BEHAVIORAL PATTERN RECOGNITION

(71) Applicant: ROYAL BANK OF CANADA, Toronto (CA)

(72) Inventors: Kostya Belezko, Toronto (CA); Brechann McGoey, Toronto (CA)

(73) Assignee: Royal Bank of Canada, Toronto (CA)

( * ) Notice: Subject to any disclaimer, the term of this patent is extended or adjusted under 35 U.S.C. 154(b) by 146 days.

(21) Appl. No.: 17/062,900

(22) Filed: Oct. 5, 2020

(65) Prior Publication Data

US 2021/0103574 A1  Apr. 8, 2021

Related U.S. Application Data

(60) Provisional application No. 62/909,860, filed on Oct. 3, 2019.

(51) Int. Cl.
  *G06F 7/00*   (2006.01)
  *G06F 16/22*  (2019.01)
  *G06N 7/01*   (2023.01)

(52) U.S. Cl.
  CPC ...... *G06F 16/2272* (2019.01); *G06F 16/2264* (2019.01); *G06N 7/01* (2023.01)

(58) Field of Classification Search
  CPC ............. G06F 16/2228; G06F 16/2264; G06F 16/2272; G06F 16/211; G06F 16/245; G06N 20/00; G06N 5/022; G06N 7/005; G06N 7/01
  See application file for complete search history.

(56) References Cited

U.S. PATENT DOCUMENTS

| 10,936,658 B2 * | 3/2021 | Wu ..................... G06F 16/9024 |
| 2005/0044073 A1 * | 2/2005 | Inokuchi ............. G06F 16/2465 |

(Continued)

FOREIGN PATENT DOCUMENTS

CN   104408464 A  *  3/2015  ........... G06K 9/6281

OTHER PUBLICATIONS

Shervashidze, Nino et al. "Weisfeiler-Lehman Graph Kernels." J. Mach. Learn. Res. 12 (2011): 2539-2561.

(Continued)

*Primary Examiner* — Mohammad A Sana
(74) *Attorney, Agent, or Firm* — Norton Rose Fulbright Canada LLP

(57) ABSTRACT

Disclosed are systems, methods, and devices for pattern extraction. A graph data structure is generated, reflective of a directed graph having vertices representative of entities and edges representative of relationships between two entities. A subgraph data structure is generated, reflective of a plurality of subgraphs of the directed graph. A similarity matrix data structure is generated by applying a graph kernel to obtain a subgraph similarity matrix including a plurality of entries, each entry providing a score of the similarity between two subgraphs of the plurality of subgraphs. A clustering data structure is generated, reflective of a plurality of groups of the plurality entities upon processing the similarity matrix data structure. For at least a given one of the plurality of groups, a common pattern data structure is generated corresponding to a subgraph that is similar to subgraphs in the given group.

22 Claims, 24 Drawing Sheets

(56) References Cited

U.S. PATENT DOCUMENTS

| | | | | |
|---|---|---|---|---|
| 2011/0268364 | A1* | 11/2011 | Hido | G06F 16/9024 |
| | | | | 382/218 |
| 2013/0097138 | A1* | 4/2013 | Barkol | G06F 16/24544 |
| | | | | 707/706 |
| 2016/0196174 | A1* | 7/2016 | Jacob | G06F 11/079 |
| | | | | 714/37 |
| 2017/0154445 | A1* | 6/2017 | Maruhashi | G06N 7/005 |
| 2020/0081445 | A1* | 3/2020 | Stetson | G06N 5/02 |
| 2020/0257730 | A1* | 8/2020 | Srinivas | G06N 20/00 |

OTHER PUBLICATIONS

Graph Database Use Case: Fraud detection http://sparsity-technologies.com/blog/graph-database-use-case-fraud-detection-2/.

Scikit-learn: Machine Learning in Python, Pedregosa et al., JMLR 12, pp. 2825-2830, 2011.

Yuan H. A bound on the spectral radius of graphs. Linear Algebra and its Applications. Sep. 1, 1988;108:135-9.

Radenković S, Gutman I. Relation between Wiener Index and spectral radius. Kragujevac Journal of Science. 2008;30:57-64.

Investigating a money laundering scheme https://linkurio.us/blog/investigating-money-laundering-scheme/.

\* cited by examiner

| SRC | DST | WEIGHT |
|---|---|---|
| B0 Inc. | PROFESSIONAL FIRMS | 3.823334e+04 |
| B1 Inc. | OTHER | 3.000000e+04 |
| B3 Inc. | CONSUMER SERVICES | 1.300000e+05 |
| B4 Inc. | PUBLIC SECTOR | 7.660486e+07 |
| B5 Inc. | LOGISTICS | 9.228920e+09 |

FIG. 4

| [[0. , 0.6, 0.8], [0.6, 0. , 1. ], [0.8, 1. , 0. ]] | [[0. , 0.4, 0.2], [0.4, 0. , 0. ], [0.2, 0. , 0. ]] |
|---|---|
| D | S |

```
ALG 1. MODEL GRAPH
    INPUT: stream of transactions
    OUTPUT: graph G

B := ∅
    I := ∅

For each transaction record < b_i, b_j, amount >
        i_i = Industry(b_i)
        i_j = Industry(b_j)

B += {b_i, b_j}
        I += {i_i, i_j}

E_inbound += Edge(i_i, b_j, weight = amount)
        E_outbound += Edge(b_i, i_j, weight = amount)

V = B ∪ I
    E = E_inbound ∪ E_outbound
    G = (V, E)
    RETURN G
```

FIG. 16A

```
ALG 2. MODEL GRAPH NORMALIZATION
    INPUT: graph G
    OUTPUT: normalized graph G FOR EACH VERTEX i ∈ I
        D_in = income_degree(i)
        FOR EACH EDGE e = (b, i)
```

$$e.weight = \frac{e.weight}{D_{in}}$$

```
        D_out = outcome_degree(i)
        FOR EACH EDGE e = (i, b)
```

$$e.weight = \frac{e.weight}{D_{out}}$$

FIG. 16B

```
ALG. 3. GRAPH_DECOMPOSITION
    INPUT: normalized graph G, degree of relationship R
    OUTPUT: set of graphs { ∀b, G_b^R }

FOR EACH VERTEX b ∈ B
        N(b) = { b }

FOR i = 1 TO R
            N(b) = G.Neighbors(N(b))

G_b^R = G.subgraph(N(b))

RETURN { G_b^R }
```

FIG. 16C

```
ALG. 4. GRAPH_KERNEL
    INPUT: set of graphs G^K(b)
    OUTPUT: similarity matrix S Apply Weisfeiler-Lehman graph kernel
```

FIG. 16D

```
ALG. 8.1 CLUSTERING
    INPUT: similarity matrix S, density threshold ε
    OUTPUT: set of clusters C = { C⁰, C¹, ..., C^(K-1) }

# Build initial cluster C⁰
    C⁰.index = 0
    C⁰.size = |S|
    C⁰.similarity = S₀ = S
    C⁰.distance = D₀ = RBF_HEAT(S₀)
    C⁰.SR = SPECTRAL_RADIUS(D₀)
    C⁰.density = 0

# Maintain queue and append root cluster (index=0)
    Q = { C⁰ }

WHILE Q ≠ ∅
        C^ab = Q.pop()
        Labels = SPECTRAL_CLUSTERING(C^ab.similarity)
        C^a, C^b = PARTITION(C^ab, Labels)

FOR c IN { C^a, C^b }
            IF c.density < ε THEN
                # no further partition, append to results
                C.append(c)
            ELSE IF c.size > 3 then
                # partition again
                Q.append(c)
            ELSE
                # discard cluster as noise
                Pass

# C has clusters of different indices, normalize them to the range of [0, K − 1]
    RETURN C
```

FIG. 16E

ALG 5.2 SPECTRAL_CLUSTERING
   INPUT: similarity matrix $S$
   OUTPUT: Labels[i] = $\begin{cases} 0, if f\ p_i \in C^a \\ 1, if f\ p_i \in C^b \end{cases}$

FIG. 16F

ALG 5.3 RBF_HEAT
   INPUT: similarity matrix $S$
   OUTPUT: distance matrix D $$D = e^{\frac{-S^2}{2\sigma^2}}$$

We compute distance matrix D by applying the Gaussian (RBF, heat) kernel over S.
Empirical tests show good results with $\sigma = 0.3$

FIG. 16G

ALG 5.4 PARTITION
    INPUT: parent cluster $C^{ab}$, Labels
    OUTPUT: two sub-clusters $C^a$, $C^b$

*# split by labels*
    $C^a = C^{ab}[\text{Labels} == 0]$
    $C^b = C^{ab}[\text{Labels} == 1]$

*# index of child nodes*
    $C^a.\text{index} = 2 * C^{ab}.\text{index} + 1$
    $C^b.\text{index} = 2 * C^{ab}.\text{index} + 2$

*# recalculate spectral radius and density*
    $C_a.SR = \text{SPECTRAL\_RADIUS}(C_a, distance)$
    $C^b.SR = \text{SPECTRAL\_RADIUS}(C_b, distance)$ $C_a.\text{density} = \dfrac{C_a.SR}{C_a.\text{size}}$ $C^b.\text{density} = \dfrac{C_b.SR}{C_b.\text{size}}$ RETURN $C^a, C^b$

FIG. 16H

```
ALG 6 COMMON PATTERN
    INPUT: list of clusters C = {C⁰, C¹, C², ..., C^{K-1}}
    OUTPUT: list of common patterns G^K = {G⁰, G¹, G², G^{K-1}}

FOR EACH C^k ∈ C
        G^k_{min} = ⋂ {G_b | b ∈ C^k}
        G^k_{max} = ⋃ {G_b | b ∈ C^k} set of edges
        E^k = {e | e ∉ G^k_{min} and e ∈ G^k_{max}}

FOR EACH i IN 0 TO m * 2^{|E^k|}
            G^k_i = G^k_{min}
            G^k_{list} = {G^k_{min}, G^k_{max}} r = random[0,1]

G^k_i = {e in E^k if p(e) ≥ r}

G^k_{list} := G^k_{list} ∪ G^k_i

M^k = graph_kernel( G^k_{list} )

# centroid of cluster graph has max similarity to others
        G^k = sum(M^k, axis = 0).argmax()

# append k's result to output list G^K
        G^K = G^K ∪ G^k

RETURN G^K
```

FIG. 16I

SYSTEM AND METHOD FOR BEHAVIORAL PATTERN RECOGNITION

CROSS-REFERENCE TO RELATED APPLICATIONS

This application claims all benefit including priority to U.S. Provisional Patent Application 62/909,860, filed Oct. 3, 2019, and entitled "SYSTEM AND METHOD FOR BEHAVIORAL PATTERN RECOGNITION"; the entire contents of which are hereby incorporated by reference herein.

FIELD

This disclosure relates to pattern recognition, and more specifically to recognition of behavioural patterns in data sets.

BACKGROUND

Large data sets contain a wealth of information about actions and events, some of which may be repeated as behaviours of certain entities. However, large data sets have high complexity, which can impose a high computational load and also a high cognitive load. There is a need for more efficient processing of such data sets.

SUMMARY

In accordance with one aspect, there is provided a computer-implemented system for pattern extraction. The system includes at least one processor; memory in communication with the at least one processor, and software code stored in the memory, which when executed by the at least one processor causes the system to: generate a graph data structure reflective of a directed graph comprising: a plurality of vertices, each representative of a corresponding one of a plurality of entities; and a plurality of edges each representative of a relationship between two of the vertices; generate a subgraph data structure reflective of a plurality of subgraphs upon processing the graph data structure to decompose the directed graph into the plurality of subgraphs; generate a similarity matrix data structure by applying a graph kernel to obtain a subgraph similarity matrix including a plurality of entries, each entry providing a score of the similarity between two subgraphs of the plurality of subgraphs; generate a clustering data structure reflective of a plurality of groups of the plurality entities upon processing the similarity matrix data structure; and for at least a given one of the plurality of groups, generating a common pattern data structure corresponding to a subgraph that is similar to subgraphs in the given group.

In accordance with another aspect, there is provided a computer-implemented method for pattern extraction. The method includes generating a graph data structure reflective of a directed graph comprising: a plurality of vertices, each representative of a corresponding one of a plurality of entities; and a plurality of edges each representative of a relationship between two of the vertices. The method also includes generating a subgraph data structure reflective of a plurality of subgraphs upon processing the graph data structure to decompose the directed graph into the plurality of subgraphs; generating a similarity matrix data structure by applying a graph kernel to obtain a subgraph similarity matrix including a plurality of entries, each entry providing a score of the similarity between two subgraphs of the plurality of subgraphs; generating a clustering data structure reflective of a plurality of groups of the plurality entities upon processing the similarity matrix data structure; and for at least a given one of the plurality of groups, generating a common pattern data structure corresponding to a subgraph that is similar to subgraphs in the given group.

In accordance with yet another aspect, there is provided a non-transitory computer-readable medium having stored thereon machine interpretable instructions which, when executed by a processor, cause the processor to perform a computer-implemented method for pattern extraction. The method includes generating a graph data structure reflective of a directed graph comprising: a plurality of vertices, each representative of a corresponding one of a plurality of entities; and a plurality of edges each representative of a relationship between two of the vertices. The method also includes generating a subgraph data structure reflective of a plurality of subgraphs upon processing the graph data structure to decompose the directed graph into the plurality of subgraphs; generating a similarity matrix data structure by applying a graph kernel to obtain a subgraph similarity matrix including a plurality of entries, each entry providing a score of the similarity between two subgraphs of the plurality of subgraphs; generating a clustering data structure reflective of a plurality of groups of the plurality entities upon processing the similarity matrix data structure; and for at least a given one of the plurality of groups, generating a common pattern data structure corresponding to a subgraph that is similar to subgraphs in the given group.

Many further features and combinations thereof concerning embodiments described herein will appear to those skilled in the art following a reading of the instant disclosure.

DESCRIPTION OF THE FIGURES

In the figures,

FIG. 4 is a table showing a portion of an example data structure inputted to the pattern extraction system of FIG. 1, in accordance with an embodiment;

FIG. 16A-16I each show an algorithm implemented by the pattern extraction system of FIG. 1, in accordance with an embodiment;

DETAILED DESCRIPTION

Figure 1:
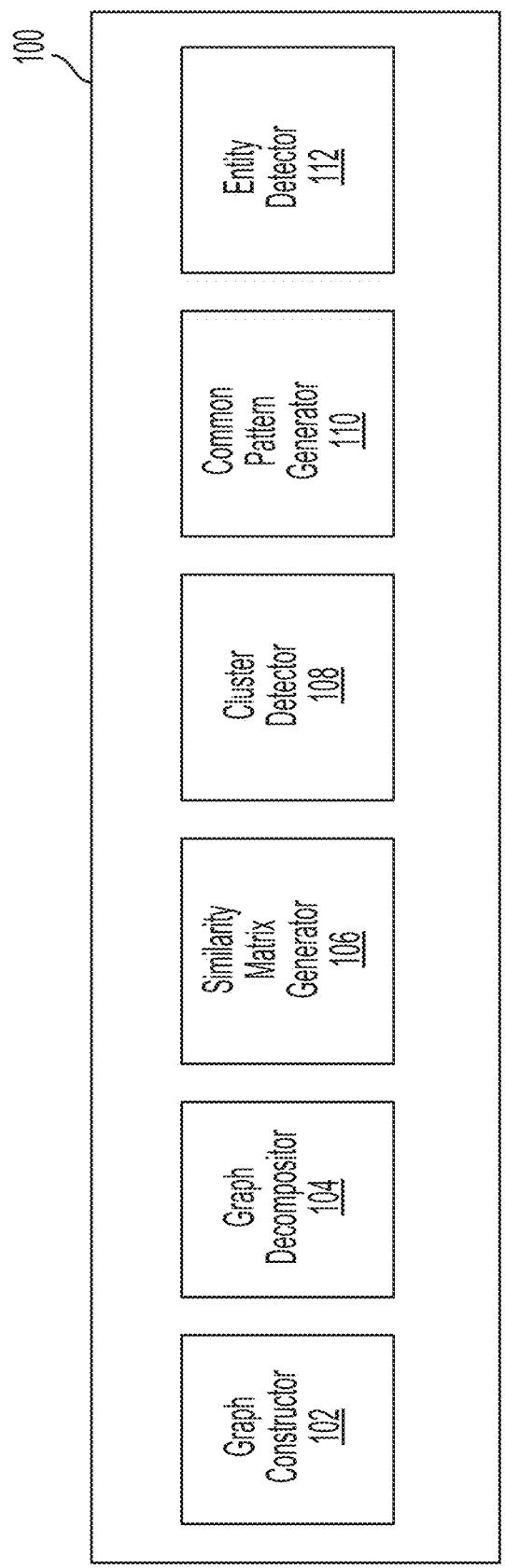
FIG. 1 is a schematic diagram of a pattern extraction system, in accordance with an embodiment.

Disclosed herein are systems, devices, and methods for recognizing behavioural patterns of entities. Such behavioral patterns may include actions taken by such entities, practices adopted by such entities, events relating to such entities, where such actions, practices, events, or the like are repeated. The repetition may occur across entities, e.g., two entities engaging in similar behaviour, or may occur across time, e.g., one entity engaging in similar behaviour at separate instances of time. Entities may be organizations such as, for example, businesses, or may be individuals. Entities may also be groupings of entities such as, for example, industries. Entities may also refer to aspects of another entity such as an asset, an account, an office, etc.

In one aspect of this disclosure, systems, devices, and methods are provided for finding a set of entities and their common structural pattern which resembles all members in a set. In another aspect of this disclosure, systems, devices, and methods are provided for using a common structural pattern to detect one or more entities exhibiting particular behaviour defined by a common structural pattern. In another aspect of this disclosure, systems, devices, and methods are provided for using the common structural patterns to detect deviations from a particular behaviour or set of behaviours. In this disclosure, a common structural pattern may also be referred to as a "common pattern" for convenience.

As detailed herein, embodiments of systems, devices, and methods implement graph theory to analyze relationships within instances of interconnected data.

In some embodiments, complex datasets which encompass relationships are presented as a graph or network of interconnected entities. These entities become vertices of the graph and edges show an aspect of the relationship (including connection or transformation) between pairs of entities. In this disclosure, the terms "entities" and "vertices" are used interchangeably, where an entity represents a business object (such as an individual, a business, an industry, or the like), and a vertex is its counterpart in the language of graph theory. The detection or identification of patterns from such datasets may be referred to herein as pattern extraction.

Due to the flexible utility of graphs as representational models, in some embodiments, counterintuitively, even data that do not exhibit graph-like structure can be mapped into a graph model.

As will be elaborated upon in the examples described herein, in the context of the financial domain, certain entities might be financial institutions, people, accounts, businesses, bank branches, etc. For example, in a case of a person having a bank account, two vertices, person and account, are interconnected by an edge of "has".

Furthermore, different datasets can be combined together to build a heterogeneous graph such that each entity (e.g., a person) becomes a part of a constellation of surrounding vertices. In this case, each entity can be viewed as possessing a certain structure. When two or more entities have similar structures, they can be viewed as sharing a similar behavioral pattern, or having a structural pattern in common.

Constellations of data sharing similar structural patterns might be grouped into collections of representative behavioural models, which may also be referred to as profiles.

Embodiments of the systems, devices, and methods disclosed herein may be applied to diverse applications. For example, in the context of financial markets, by analyzing how customers perform trades and transactions, frequently repeated patterns in customer behaviour can be detected. In manners disclosed herein, the flow of customer trading and transactional activity into basic building blocks to find structural patterns of financial practices and reveal underlying motivations.

In another example, organizations may perform cyclical operations, e.g., the same transactions performed each month. By observing this periodic behavior, some embodiments of the systems, methods and devices disclosed herein can be used to profile organizations and detect anomalous behavior which can indicate potential fraud. For example, a sharp change in profit and loss may be an indicator of abnormal behaviour of an investment funds management.

More broadly, some embodiments of the systems, methods and devices disclosed herein can be applied to avoid processing multiple identical (or similar) copies within an entire dataset. Business analysis systems could instead process data using patterns of data, which is more computationally efficient. Further, by categorizing patterns, inferences can be drawn on overall data diversity, tendency and complexity. The data might be very large in volume but at the same time very simple if a pattern is frequently repeated.

FIG. 1 illustrates a pattern extraction system 100, in accordance with an embodiment. In the depicted embodiment, pattern extraction system 100 includes a graph constructor 102, a graph decompositor 104, a similarity matrix generator 106, a cluster detector 108, a common pattern generator 110, and an entity detector 112.

Graph constructor 102 receives a dataset having data reflective relationships between various entities. The dataset may include, for example, data reflective of entity activity, which may include transactions or other actions taken by a entity. Such actions may be taken vis-à-vis another entity, and therefore describe an aspect of a relationship between two entities. The dataset may also include, for example, data reflective of properties of an entity, which may describe other aspects of a relationship between two entities.

Graph constructor 102 maps the dataset to a graph representation and generates a new data structure that defines this graph representation.

Graph decomposer 104 receives the data structure defining the graph representation and decomposes the represented graph into a plurality of subgraphs. For example, within the data structure, an entity may be described in association with a subgraph of a neighborhood structure (or any other region of interest). To this end, graph decompositor 104 generates a plurality of data structures, each representing one of the subgraphs.

Similarity matrix generator 106 receives the data structures representing the plurality of subgraphs and processes these data structures to construct a further data structure that represents a subgraph similarity matrix. Each entry in matrix S[i,j] bears a score of similarity between subgraphs i and j. In the depicted embodiment, similarity matrix generator 106 applies a Weisfeiler-Lehman Kernel to obtain the similarity matrix. In other embodiments, other kernels or other methods of evaluating similarity may also be used.

Cluster detector 108 processes the data structure representing the subgraph similarity matrix to find groups of similar subgraphs. In the depicted embodiment, cluster detector 108 implements a clustering algorithm, as detailed below. Cluster detector 108 generates a plurality of data structures, each representing a grouping of similar subgraphs.

Common pattern generator 110 processes the data structures representing groupings of similar subgraphs, and for each group of similar subgraphs, synthesizes a new subgraph equally similar to all subgraph in group. This subgraph may be referred to a common pattern. Common pattern generator 110 generates a data structure defining the common pattern.

For each common pattern, common pattern generator 110 provides an identifier of at least one entity that exhibits behaviour similar to the common pattern. Common pattern generator 110 provides, for example, an identifier of an entity represented by a vertex within the group of subgraphs used to synthesize the common pattern.

Entity detector 112 detects entities that exhibit behaviour similar to a common pattern, e.g., as defined in a common pattern data structure generated by common pattern generator 110.

When a new data set is received, a new graph data structure is generated by graph constructor 102. The new data set differs from the initial data set used to generate a common pattern data structure, such that the new graph differs from the initial graph by at least one vertex or at least one edge. Graph decomposer 104 processes the graph data structure to decompose the new graph into a plurality of subgraphs, and generates a new subgraph data structure reflective of these new subgraphs.

Entity detector 112 then searches among these new subgraphs for one or more subgraphs that are similar to a given common pattern. For example, entity detector 112 may detect such entities by searching for one or more of the new subgraphs having a similarity or a distance relative to the common pattern that meets pre-defined criteria, such as a similarity metric greater than a pre-defined threshold or a distance metric less than a pre-defined threshold. Entity detector 112 provides an identifier of each detected entity.

The operation of pattern extraction system 100 is further described with reference to FIG. 2 and example blocks 200 and onward illustrated therein, and with reference to example data relating to cash flow (or other flow of value) among businesses of different industrial sectors. In this example, operation of pattern extraction system 100 identifies entities exhibiting similarities, e.g., businesses conducting a similar type of business. For example, the businesses Home Depot and Lowe's may be determined by operation of pattern extraction system 100 to share a common pattern with businesses in a "Home Improvement" group.

Multiple common patterns may be established for an entity. For example, Walmart may be determined to share a common pattern with businesses in a "Grocery" group and a common pattern with businesses in a "Retail" group.

Figure 2:
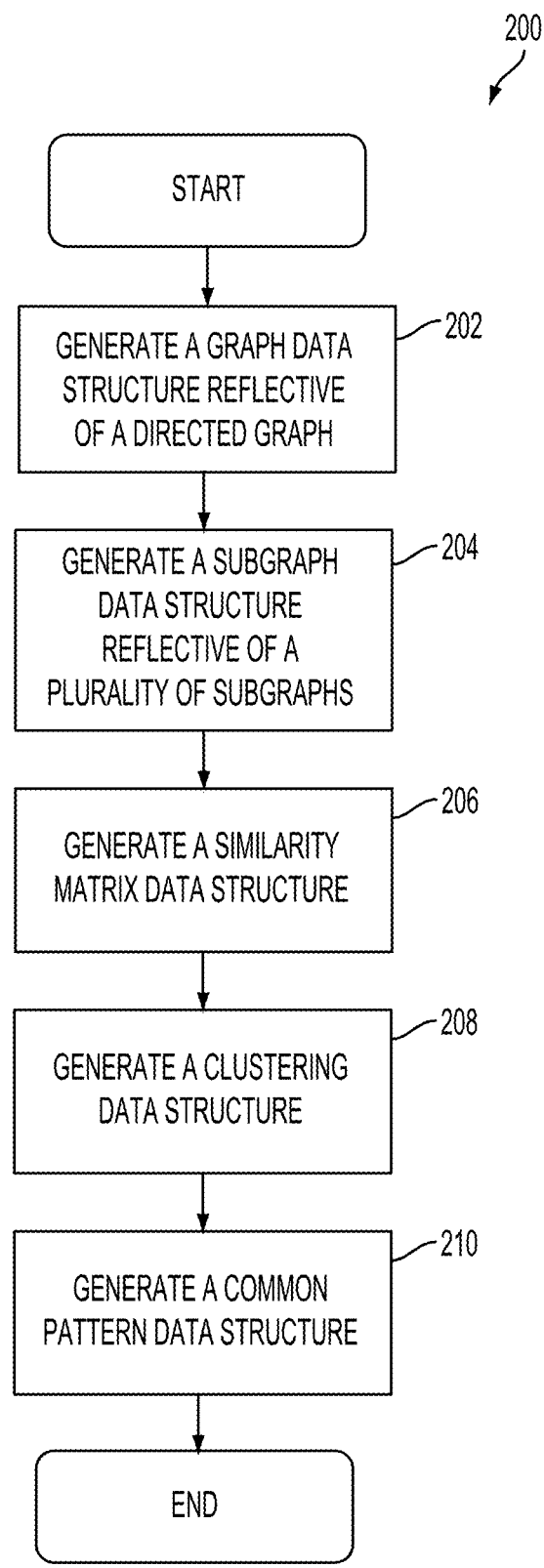
FIG. 2 is a flowchart showing example steps performed by the pattern extraction system of FIG. 1, in accordance with an embodiment.

It should be understood that steps of one or more of the blocks depicted in FIG. 2 may be performed in a different sequence or in an interleaved or iterative manner. Further, variations of the steps, omission or substitution of various steps, or additional steps are contemplated.

Figure 3:
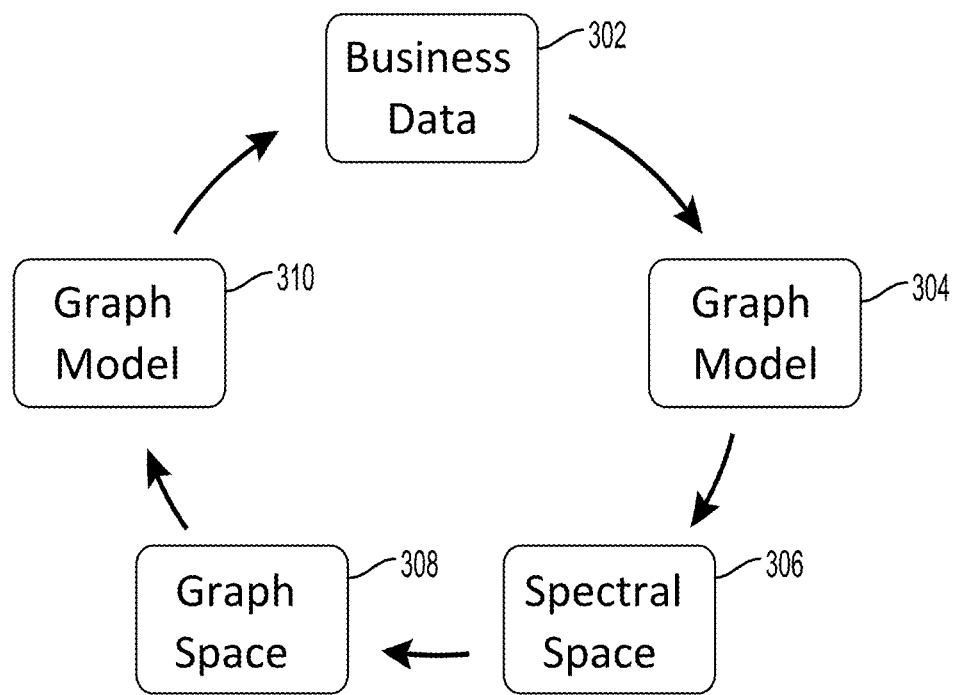
FIG. 3 is a graph showing the transformation of data into various mathematical spaces, in accordance with an embodiment.

As will be apparent, operation of system 100 causes the data set to be transformed several times into different mathematical spaces, as shown in FIG. 3. Initially business-related data 302 is transformed to into an abstract graph model 304, which is then transformed into spectral space data 306, which is then transformed into graph space data 308, which is then converted into a further graph model 310, which is then transformed back into business-related data. In this way, at the end, processed data are cast back into a business domain to obtain interpretable results.

As depicted in FIG. 2, operation of system 100 begins at block 202. At block 202, system 100 receives a data set reflecting business transactions across different industrial sectors. Each transaction reflects a relationship between two financial entities of a sender and a receiver, as shown in a portion of an example data set shown in FIG. 4. In FIG. 4, each row includes a data element for a transaction source entity (e.g, sender business B0 Inc., B1 Inc., and so on), a transaction destination entity (e.g., receiver industries "Professional Firms", "Public Sector" and so on), and a weight, which may be proportional to the amount of funds being transacted or another transaction parameter.

In some embodiments, the data set is received as a data stream. In some embodiments, the data set is received by way of a network.

In some embodiments, a data set is distributed across multiple devices and stored using a distributed file system. In one specific embodiment, the distributed file system is the Hadoop Distributed File System provided by the Apache Software Foundation. In some embodiments, data is retrieved for processing from a distributed file system by way a cluster computing framework. In one specific embodiment, cluster computing framework is Apache Spark provided by the Apache Software Foundation.

Continuing at block 202, graph constructor 102 generates a graph data structure reflective of a directed graph. The directed graph has a plurality of vertices, each representative of a corresponding one of a plurality of entities and a plurality of edges each representative of a relationship between two of the vertices.

In this example, a directed graph has vertices of two types, either a business or an industry. In this example, the edges of the graph are connecting only businesses to industries, and not two industries or two businesses.

In the following description, a set of business vertices by $\mathcal{B}$ and each individual business by b. Similarly, industries are denoted by I and $i$.

As an example, a path in the graph would represent a cash flow through the market may be:

$$b_1 \to i_5 \to b_7 \to i_3 \to b_3 \to i_4$$

Formally, the graph is defined as G=(V,E)
V=B∪I
E=$E_{inbound} \cup E_{outbound}$
Such that each $b \in B$, $i \in I$
$E_{inbound}$={($i$,b) business b benefits from industry $i$}
$E_{outbound}$={(b,$i$) business b invests into industry $i$}

Figure 5:
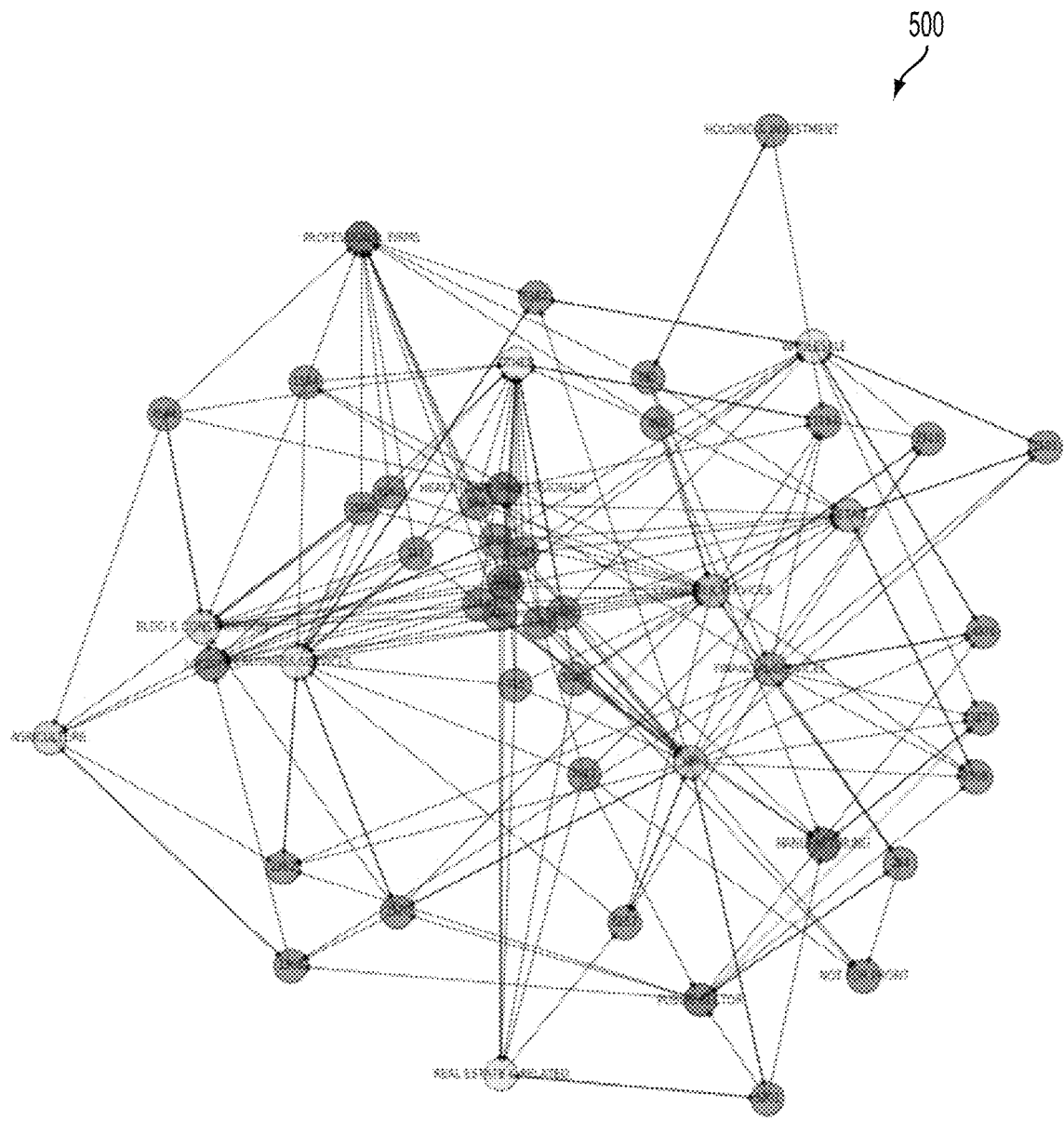
FIG. 5 is an example graph generated by the pattern extraction system of FIG. 1, in accordance with an embodiment.

FIG. 5 depicts an example graph 500, as generated by graph constructor 102. In graph 500, numbered vertices represent particular business entities while other vertices represent particular industries.

FIG. 16A depicts an example algorithm 1 that may be implemented by graph constructor 102 to generate directed graphs as described herein.

Graph constructor 102 casts business-related data into an academic domain. Of interest is the structural proximity across a set of specific vertices (businesses). The problem may be re-formulated to be: by a given graph G=(V,E), find common similarities across a subset $\mathcal{B} \subseteq V$ of the graph's vertices.

In this example, the problem is defined to be finding one or more structural patterns of businesses having similar forms of financial behaviour in terms of sets of industries they invest into and set of industries they benefit from.

For solving this specific business problem, graph constructor 102 constructs an unweighted graph (edge weight is set to 1.0). However, for other examples and other problems, the edge weight does not need to be constant. For example, weights could represent the relative percentage of investment/benefits to/from a particular industry. The direction of arrows in graph 500 shows whether investments/benefits are send to or received from a particular industry. Weights could reflect different qualities in different scenarios.

Figure 6:
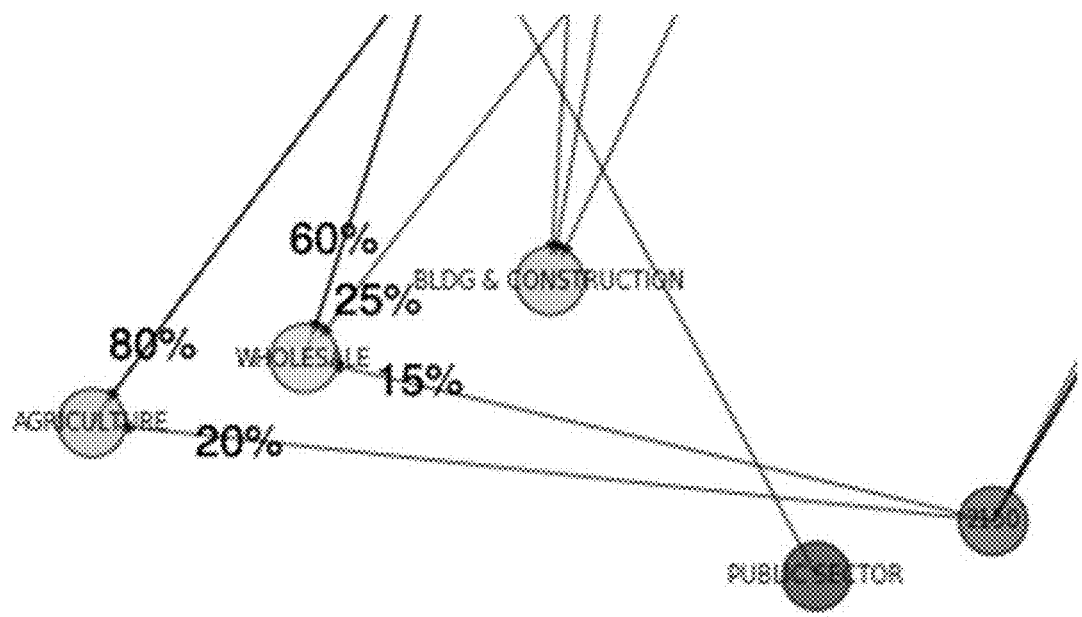
FIG. 6 is a portion of an example graph including calculated weights for edges, in accordance with an embodiment.

In an embodiment, graph constructor 102 implements algorithm 2 illustrated in FIG. 16B to normalize the weights of each industry so as to outline the percentage of cash flow given by each contributing business. FIG. 6 shows a portion of a graph with such percentages included as edge weights.

At block 204 (FIG. 2), graph decomposer 104 generates a subgraph data structure reflective of a plurality of subgraphs upon processing the graph data structure generated by graph constructor 102. In particular, graph decomposer 104 decomposes a graph G (defined in the graph data structure) into a set of subgraphs, each representing a particular business from $\mathcal{B}$ and its neighbours of industries I (cash flow in/out) such as each business $b \in \mathcal{B}$ is represented by its neighbours as a directed star graph $G_b$.

Figure 7A:
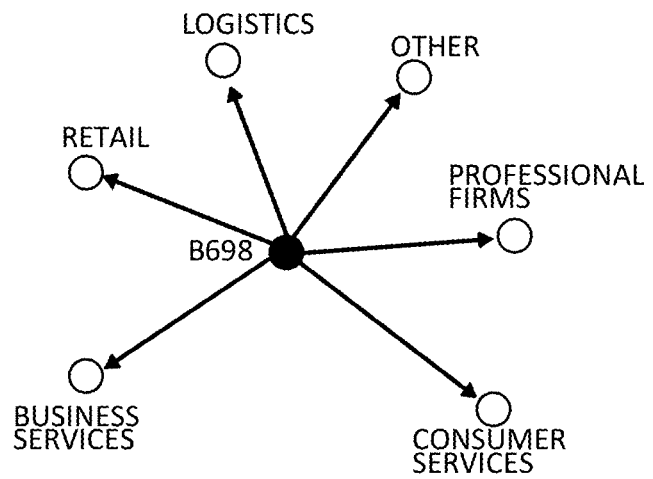
FIG. 7A, FIG. 7B, and FIG. 7C are each subgraphs, in accordance with an embodiment.
Figure 7B:
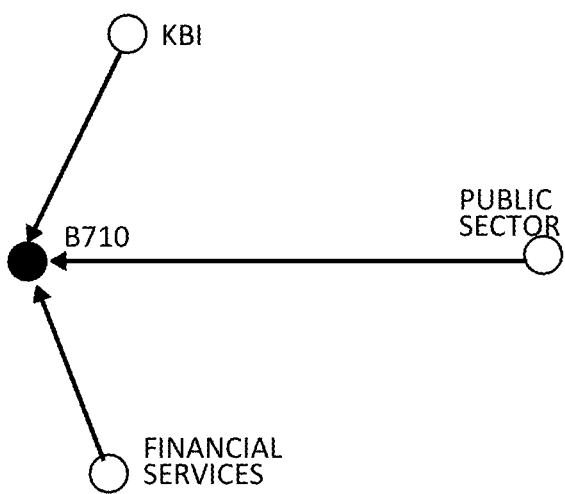
Figures 7C, 8:
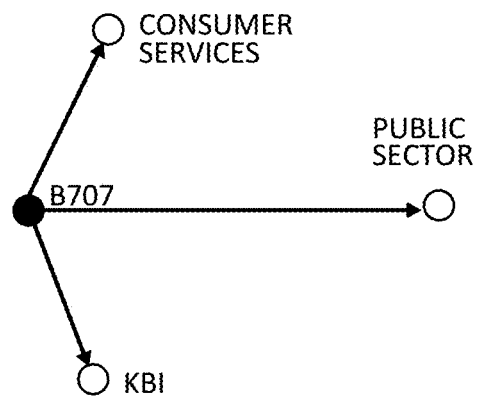
FIG. 8 is a table showing an example similarity matrix and a corresponding distance matrix, in accordance with an embodiment.

FIG. 7A, FIG. 7B, and FIG. 7C each show a subgraph, each subgraph representing a structure of 1-degree relationship for a business (e.g., business B698, B710, and B707 each shown as a solid-circle vertex) surrounded by neighbours from the set of industries.

In this example, graph decomposer 104 captures the first circle of relationships (first degree) of neighbours (Hyperparameter R=1). However, graph decomposer 104 can also capture a wider range (R>1) of relationships to form $G_b^R$.

In an embodiment, graph decomposer 104 implements the algorithm 3 illustrated in FIG. 16C to perform graph decomposition.

At block 206 (FIG. 2), similarity matrix generator 106 generates a similarity matrix data structure by applying a graph kernel to obtain a subgraph similarity matrix including a plurality of entries, each entry providing a score of the similarity between two subgraphs of the plurality of subgraphs. In particular, similarity matrix generator 106 applies a Weisfeiler-Lehman (Shervashidze, Nino et al. "Weisfeiler-Lehman Graph Kernels." *J. Mach. Learn. Res.* 12 (2011): 2539-2561) graph kernel to encode each $G_b^R$ as a vector $\overline{b}_i$ and compute their pairwise similarity (affinity) matrix S. In this way, the graph data is cast into another multidimensional space. Each entry $S_{ij}$ holds a value from 0 to 1 on how much point $\overline{b}_i$ is similar to $\overline{b}_j$. The matrix is squared and symmetric as all the points are compared pairwise.

In other embodiments, similarity matrix generator 106 can apply other graph kernels to compute similarity matrix S.

At block 208 (FIG. 2), cluster detector 108 generates a clustering data structure reflective of a plurality of groups of the plurality entities upon processing the similarity matrix data structure.

Cluster detector 108 begins by processing the similarity matrix S to obtain a distance matrix D. In the depicted embodiment, the distance matrix can be obtained according to:

$$D = 1 - S.$$

In another embodiment, the distance matrix can be obtained using RBF (radial basis function) heat, as described below.

FIG. 8 illustrates an example distance matrix D corresponding to an example similarity matrix S. In this example, there are three points forming the 3, 4, 5 Pythagorean triangle.

Figure 9A:
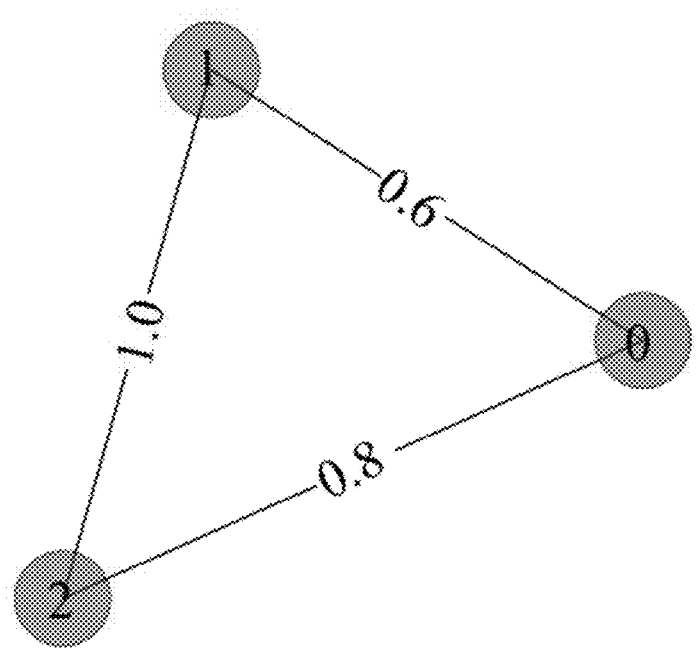
FIG. 9A and FIG. 9B each is a graph showing example ways of drawing three points on a plane.
Figure 9B:
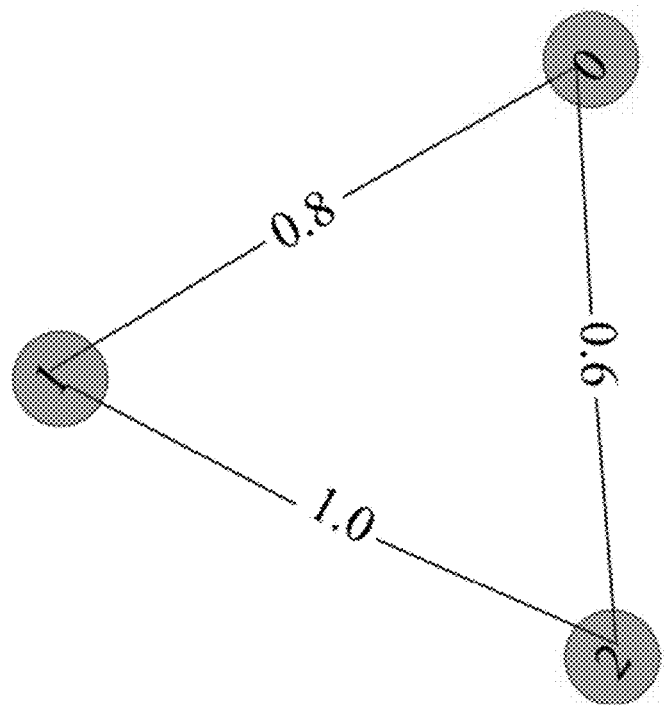

There are infinite ways to draw these three points on the plane, and the actual coordinate system may vary, and so may the angle of the triangle. Two example ways are shown in FIG. 9A and FIG. 9B. For clustering, only the similarity and distances are taken into account, and not the actual location of the points.

Figure 10:
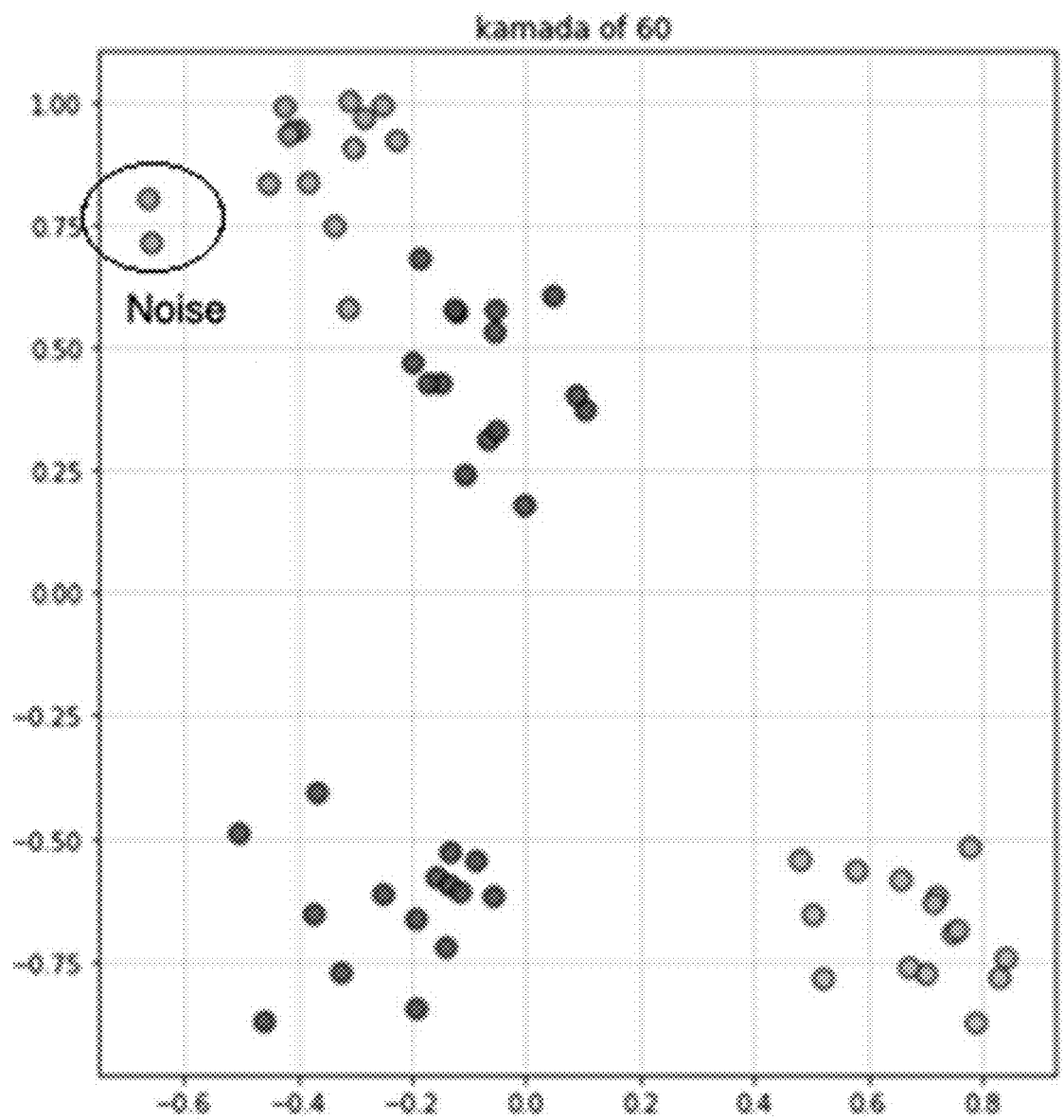
FIG. 10 is a graph showing example clustering, in accordance with an embodiment.

Continuing at block 208, cluster detector 108 groups mutually similar points $\overline{b}_i$ into clusters. In an embodiment, cluster detector performs a clustering method that combines density-based clustering and graph spectral analysis. Of interest, cluster detector 108 does not need to cluster all the given points but rather those which are compacted (spectrally dense) and filter out stand-alone outliers as a noise, for example, as shown in FIG. 10. Further, the number of clusters is initially unknown.

A variety of existing clustering algorithms are known in the art, e.g., K-means, DBSCAN, or the like. The proximity (distance or similarity) between two clusters might be defined in many various ways, e.g., nearest neighbour, farthest neighbour, UPGMA, within-group average, or the like. A silhouette coefficient is a measure of how compact points are grouped in a cluster with regard to the distance to the closest external point. This is a ratio of intra versus extra distances. Clusters with a high silhouette coefficient are said to be dense.

Some clustering algorithms require prerequisite knowledge of the number of clusters, while others adopt a greedy approach in partitioning all the available points. These two limitations are avoided in some embodiments of cluster detector 108.

Cluster detector 108 utilizes a top-bottom approach for partitioning. The process traverses binary tree structure and extends the divisive type of hierarchal clustering. A node in the tree presents a cluster. At each step (node in tree) a parent node cluster is split into two child sub-clusters using spectral clustering, then the quality of the split is estimated. Once the split of a parent cluster produces one or two child sub-clusters with a higher quality than its parent, the split is accepted, otherwise the node is turned to be a leaf. The leaves of the tree present final clusters of the partitioning. In one specific embodiment, cluster detector 108 incorporates scikit-learn (Scikit-learn: Machine Learning in Python, Pedregosa et al., JMLR 12, pp. 2825-2830, 2011) spectral clustering for K=2 clusters.

Cluster detector 108 evaluates the compactness of a cluster. In particular, the compactness can be measured in terms of cluster spectral density (CSD), as the number of points resided on its spectral radius. The spectral radius is defined as largest eigenvalue $\lambda_1$ $$\lambda_1 \geq \lambda_2 \geq \cdots \geq \lambda_n$$

$$CSD(C) = \frac{\lambda_1}{|C|}$$

Figure 11:
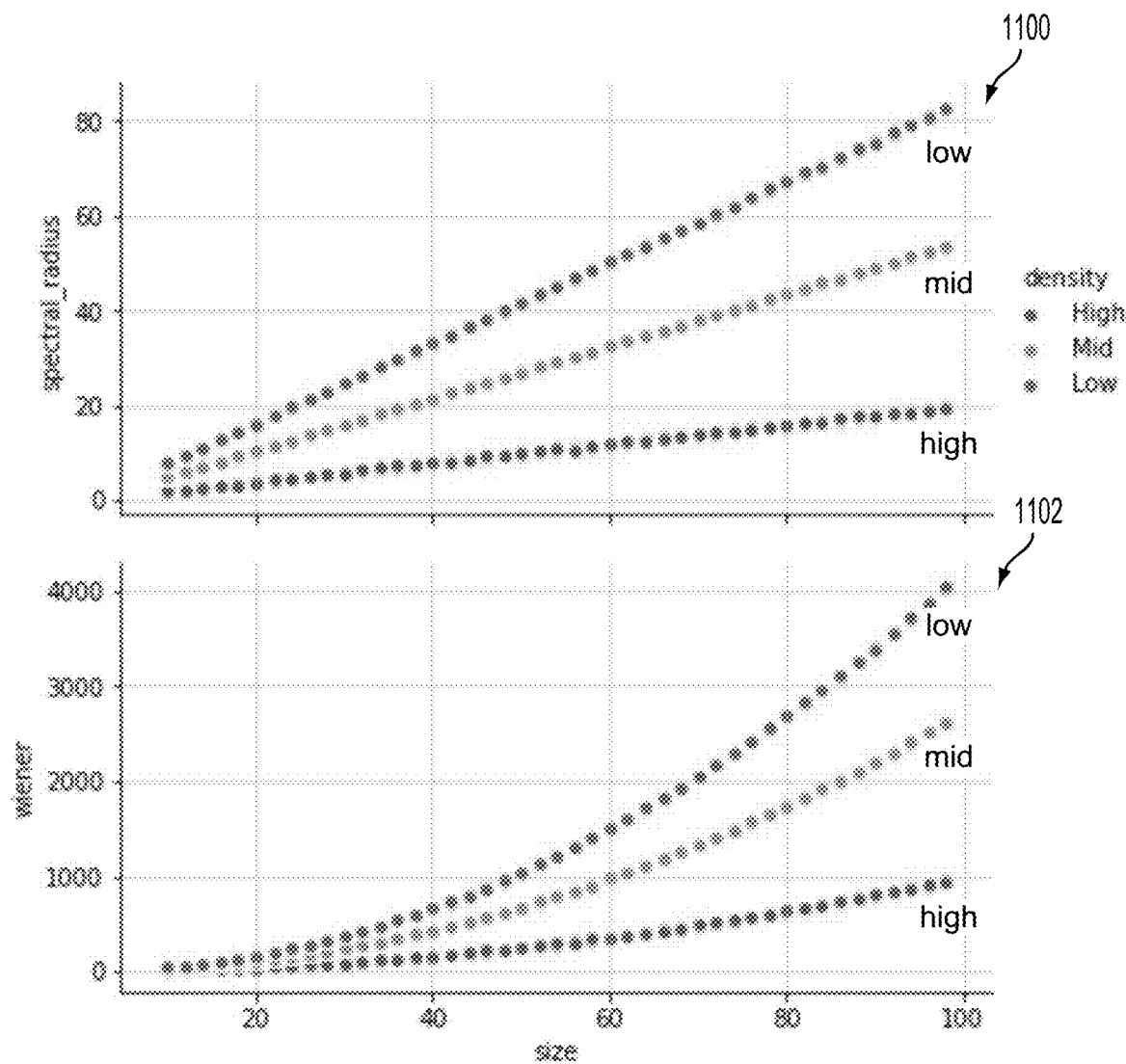
FIG. 11 is a graph of spectral density, in accordance with an embodiment.

The more points in spectral space residing within same spectral radius the denser the cluster (see FIG. 11). For n by n proximity matrix M, having $0 \leq M_{ij} \leq 1$, the spectral radius is limited:

$$\lambda_1 \leq n-1$$

There is a bound on the spectral radius of graphs, shown by Yuan H. (A bound on the spectral radius of graphs. Linear Algebra and its Applications. 1988 Sep. 1; 108:135-9):

$$\lambda_1 \leq \sqrt{2e-n+1}$$

In the case of complete proximity matrix M, the number of edges is:

$$e = \frac{n(n-1)}{2}$$

Hence, $$\lambda_1 \leq \sqrt{2e-n+1} = \sqrt{2 * \frac{n(n-1)}{2} - n + 1} = \sqrt{n^2 - 2n + 1} = \sqrt{(n-1)^2} = n-1$$

Noticeably, n−1 is the max degree of any vertex in $K_n$ graph represented by M.

Therefore, $$0 \leq CSD < 1$$

The lower the CSD, the more compact (dense) the group of points it reflects. Of interest, however, is the vanishing of that number as the size |C| goes down to 1.

In addition, the spectral radius is well correlated with Wiener Index (WI) (Radenković S, Gutman I. Relation between Wiener index and spectral radius. Kragujevac Journal of Science. 2008; 30:57-64), which is defined as the sum of the lengths of the shortest paths between all pairs of vertices. Since the graph's matrix is fully connected, the WI becomes a sum of all elements in the matrix.

In some cases, spectral radius may provide a more accurate measurement of matrix internal characteristics rather than eccentricity radius formulated as $$r = \min\{\forall i \{\max\{\forall j\, M_{ij}\}\}\}$$

However, this min/max approach is generally less accurate and loses internal characteristics of matrix.

FIG. 11 illustrates a plot 1100 of spectral radius as a function of graph size, and a plot 1102 of Wiener Index as a function of graph size, for graphs built out of a group of high/medium/low density points.

| Density as pairwise distance | Points pairwise distance range (experiment) | Similarity | Spectral Radius |
|---|---|---|---|
| High | [0, 0.4] | Low | Low |
| Mid | [0.4, 0.7] | Mid | Mid |
| Low | [0.7, 1.0] | High | High |

Figure 12:
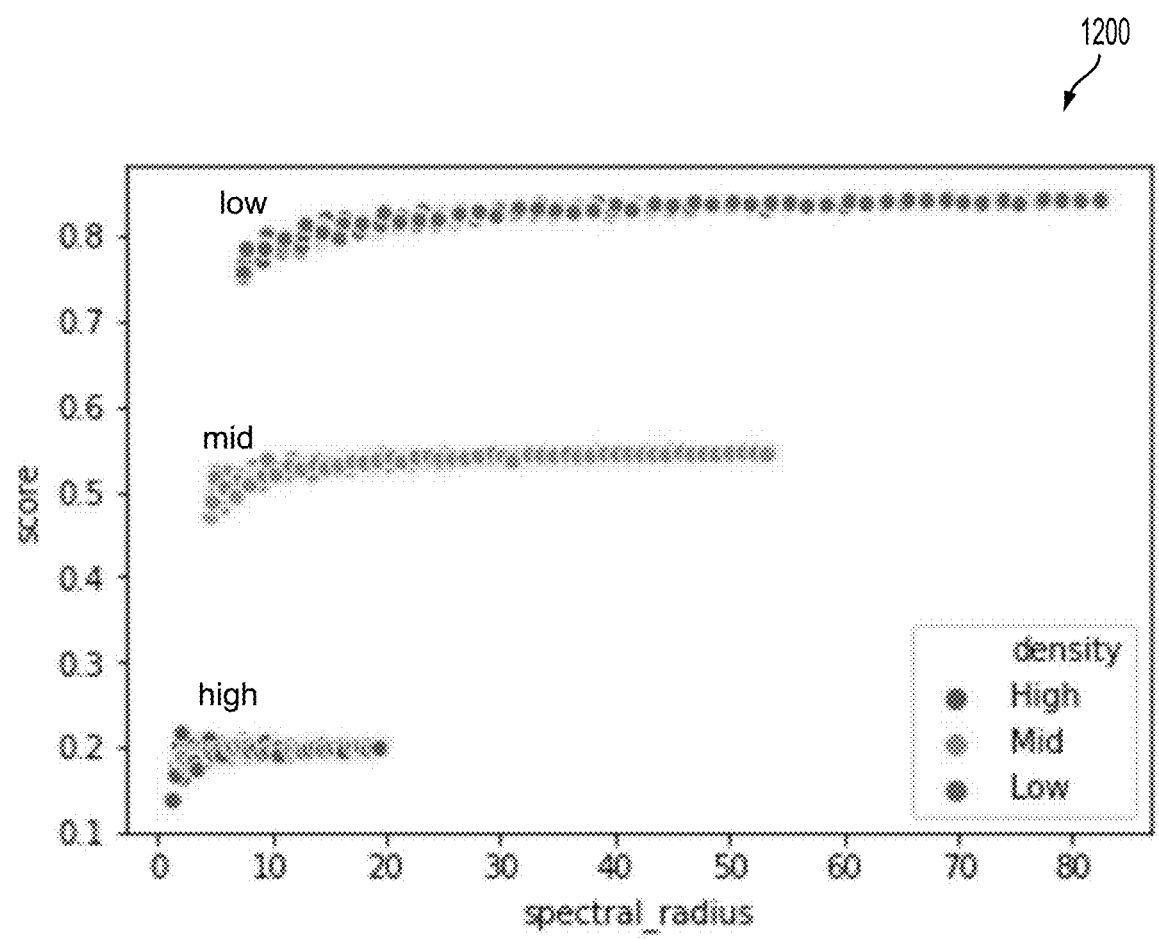
FIG. 12 is a graph showing scores as a function of spectral radius, in accordance with an embodiment.

FIG. 12 illustrates a plot 1200 of CSD as a function of spectral radius, and specifically the CSD used as cut-off score within the clustering algorithm. The CSD carries spectral radius and graph size information, and may be used to compare the compactness of two graphs having different sizes.

In an embodiment, cluster detector 210 implements the algorithms shown in FIG. 16E (algorithm 5.1 for clustering), FIG. 16F (algorithm 5.2 for spectral clustering), FIG. 16G (algorithm 5.3 for calculating RBF Heat), and FIG. 16H (algorithm 5.4 for partitioning a cluster into subclusters).

In implementing algorithm 5.1 (FIG. 16E), cluster detector 210 maintains a data structure called cluster $C_i$ containing the following parameters:
index—cluster numeric identifier
size—number of points in cluster
similarity matrix $S_i$ of the cluster points
distance matrix $D_i$ of the cluster points as RBF heat of $S_i$
SR spectral radius of $D_i$ matrix
density—a measure of cluster spectral compactness (CSD)

This algorithm processes the initial set (given as a matrix) in the top-down manner using binary tree traversal method. Each parent node i representing a cluster, is split into two child sub-cluster nodes having indices 2i+1 and 2i+2 respectively. The leaves of the tree form the final outcome clusters.

Figure 13:
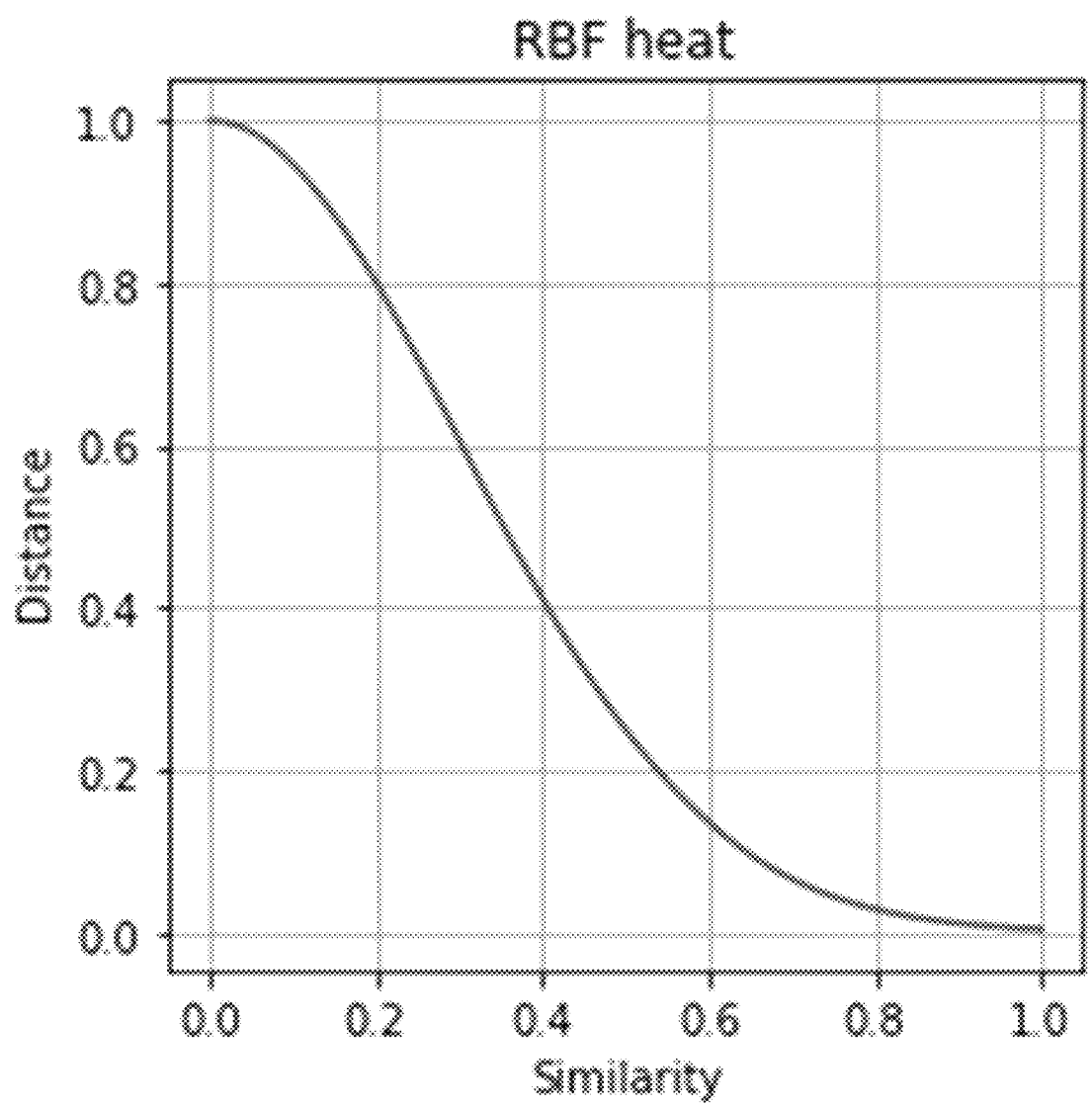
FIG. 13 is a graph of RBF heat, in accordance with an embodiment.

FIG. 13 shows an example graph of distance obtained as RBF heat.

At block 210 (FIG. 2), common pattern generator 110 generates a common pattern data structure for one or more groups of subgraphs (e.g., one or more group of businesses). First, each of the clusters $C^0, C^1, C^2, \ldots, C^{K-1}$ produced at block 210 contains disjoint sets of points which are mapped back from spectral domain to its original group of subgraphs:

$$C^k = \{G_b | b \in C^k\}$$

The same notation $C^k$ is used to collectively denote cluster members either in the form of subgraph $G_b$ or corresponding multidimensional $\vec{b}$.

Each subgraph reflects structural behaviour of the business it stands for. All subgraphs in cluster are similar to each other with a desired degree of proximity (density threshold ε).

For each cluster $C^k$, a subgraph $G^k$ is synthesized which is maximally similar to all subgraphs in cluster, called the centroid of cluster $$\forall C^k, G^k = G_x \text{ such as}$$

$$\text{Loss}(G_x) = \sum_{G_b \in C^k} d(G_b - G_x) \xrightarrow{yields} \min$$

Figure 14:
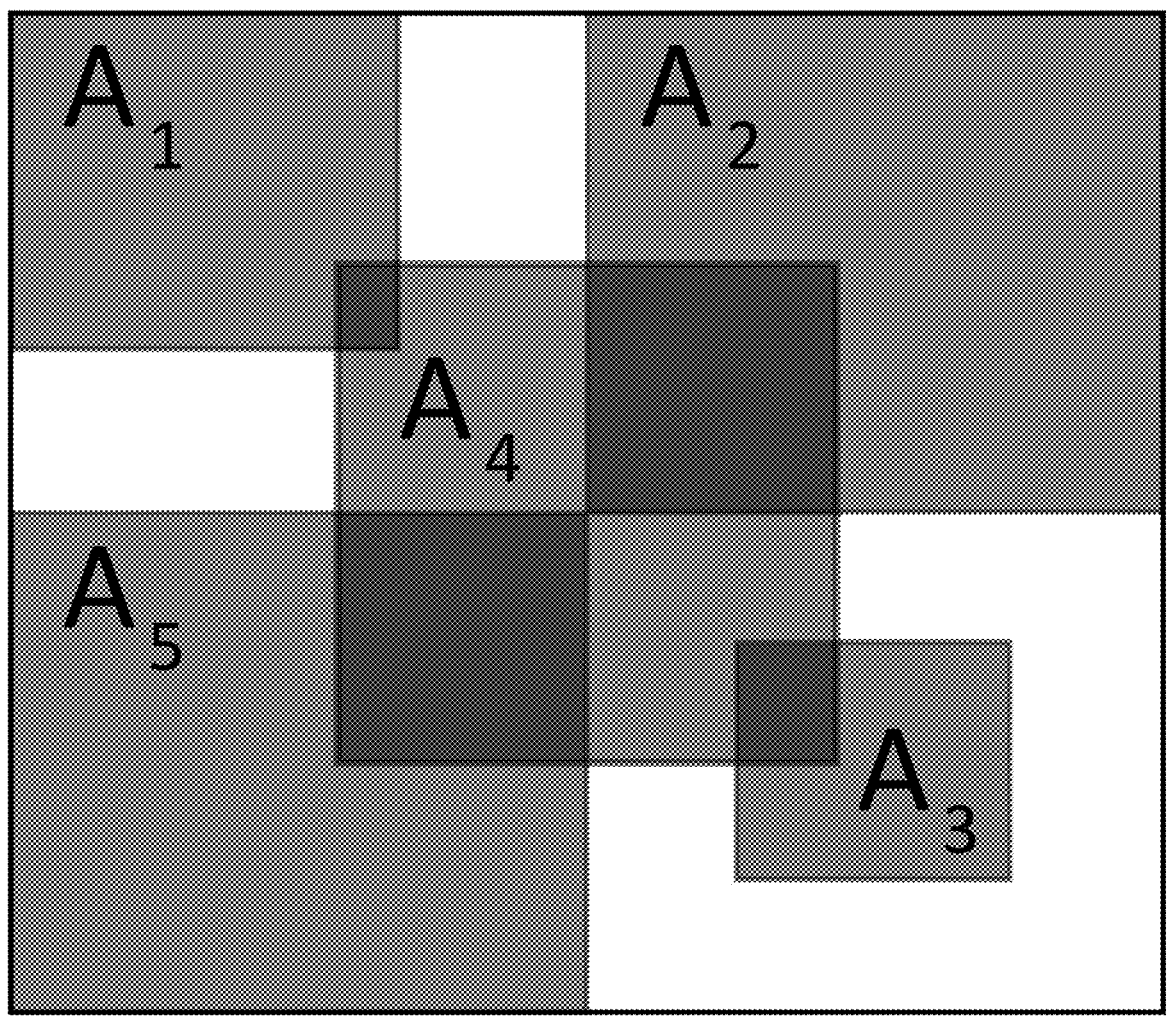
FIG. 14 is a diagram illustrating adjacency matrices, in accordance with an embodiment.

The distance d between two graphs $G_1$ and $G_2$ can be formulated as a subtraction of their adjacency matrices. All adjacency matrices are brought to the same size/format by padding with zeros, as shown in FIG. 14:

$d(A_1,A_2)=\Sigma|A_{1,ij}-A_{2,ij}|$

Finding $G_x$ requires exponential complexity to explore all the options. Accordingly, common pattern generator 110 implements a greedy algorithm evaluating a random subset of candidate subgraphs as follows.

For cluster $C^k$, the centroid of cluster graph is laid on the sequence of all graphs (denoted by $\mathcal{G}$) starting from a graph of common intersection to the graph of common union:

$$G_{min}^k = \bigcap \{G_b \mid b \in C^k\}$$
$$G_{max}^k = \bigcup \{G_b \mid b \in C^k\}$$

The edges needed to form all graphs in $\mathcal{G}$ are $$E^k = \{e \mid e \notin G_{min}^k \text{ and } e \in G_{max}^k\}$$

Therefore, there are $O(2^{|E^k|})$ graphs line on the sequence $\mathcal{G}$. The probability distribution is obtained for each edge $e$ to appear as the number of subgraphs in $C^k$ having that edge:

$$\left\{\rho(e) \mid e \in E^k, \rho(e) = \frac{\Sigma\, \delta(e, G_b)}{|C^i|}\right\}$$

Of note, edge weights are not used as a parameter in the similarity calculation.

Example probabilities for edges in a graph are as follows:

| Edge | $e_0$ | $e_1$ | $e_2$ | $e_3$ |
|---|---|---|---|---|
| Number of graphs in $C^k$ the edge appears | 3 | 4 | 2 | 1 |
| Probability | 0.3 | 0.4 | 0.2 | 0.1 |

The greedy algorithm will have $m$ passes, each time randomly selecting a subset $E_i^k \subseteq E^k$ using edges probabilities and constructing a graph:

$$G_i^k = G_{min}^k \cup E_i^k$$

A list of $m+2$ graphs $\{G_{min}^k, G_0^k, G_1^k, \ldots G_{m-1}^k, G_{max}^k\}$ is generated and algorithm 4 illustrated in FIG. 16D is applied to compute their pairwise similarity. An example pairwise similarity matrix $M^k$ is:

| | $G_{min}^k$ | $G_0^k$ | $G_1^k$ | ... | $G_{max}^k$ |
|---|---|---|---|---|---|
| $G_0^k$ | | 0 | 0.4 | 0.7 | 0.3 |
| $G_1^k$ | | 0.4 | 0 | 0.9 | 0.5 |
| ... | | 0.7 | 0.9 | 0 | 0.8 |
| $G_{max}^k$ | | 0.3 | 0.5 | 0.8 | 0 |

The graph producing the max overall similarity with others is considered as centroid of cluster bearing the mutually common structure across all subgraphs of cluster:

$$G^k = \operatorname{argmax} \sum_j M^k \operatorname{row}(j)$$

In an embodiment, cluster detector 108 generates a common pattern data structure according to algorithm 6 shown in FIG. 16I. The output of this algorithm is a centroid of cluster graph, which is taken to be the common structural pattern for a group of businesses.

Figure 15:
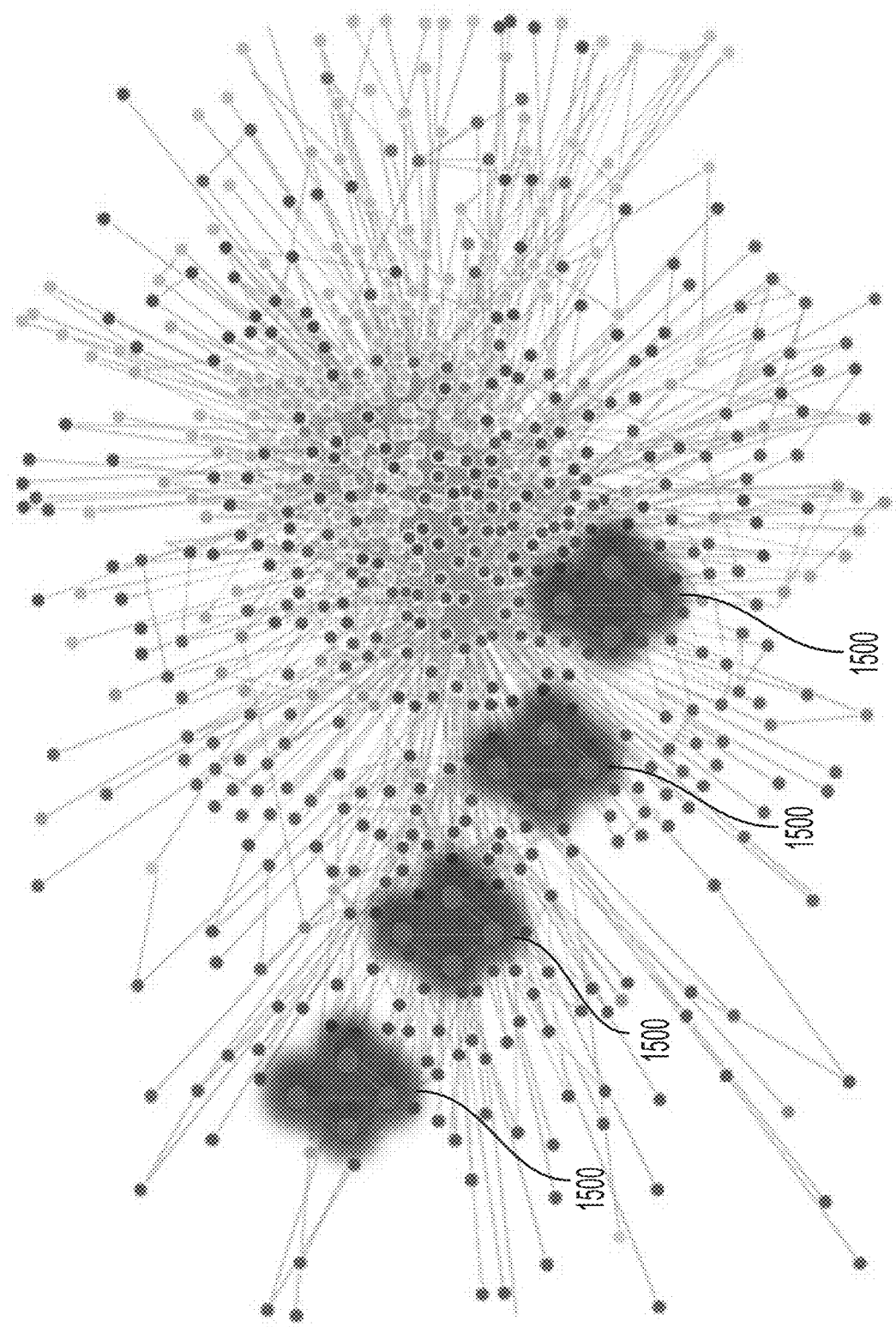
FIG. 15 is a graph showing the use of a common structural pattern to detect similar entities, in accordance with an embodiment.

The common structural pattern may be applied by entity detector 112 to a graph representation of a larger data set of many businesses (and their connected industries) to find other businesses with similar structures, i.e., similar behaviours. An example is shown in FIG. 15, with four subgraphs 1500 (corresponding to four businesses) detected using a given common pattern data structure.

Each of graph constructor 102, graph decompositor 104, similarity matrix generator 106, cluster detector 108, common pattern generator 110, and entity detector 112 may be implemented in whole or in part using conventional programming languages such as Java, J#, C, C++, C#, Perl, Visual Basic, Ruby, Scala, etc. These components of system 100 may be in the form of one or more executable programs, scripts, routines, statically/dynamically linkable libraries, or servlets.

Hyperparameters

Embodiments of pattern extraction system 100 described herein use certain hyperparameters as detailed below.

Algorithm 3 (FIG. 16C)—R is degree of relationship to capture around a vertex needed to bear its structure formation. Default R=1.

Algorithm 5 (FIG. 16E)—ε density threshold is determining how dense a cluster should be to stop splitting it over and over again. Range [0, 1], default 0.6.

Algorithm 6 (FIG. 16I)—$m$ number of iterations the greedy algorithm takes to find the optimal centroid of cluster per cluster. Given as a fraction of $2^{|E|}$ possibilities. Range [0, 1], default 0.2.

Example Use Cases

Pattern extraction system 100 may be applied to many different use cases. The following paragraphs provide a few examples.

Figure 17A:
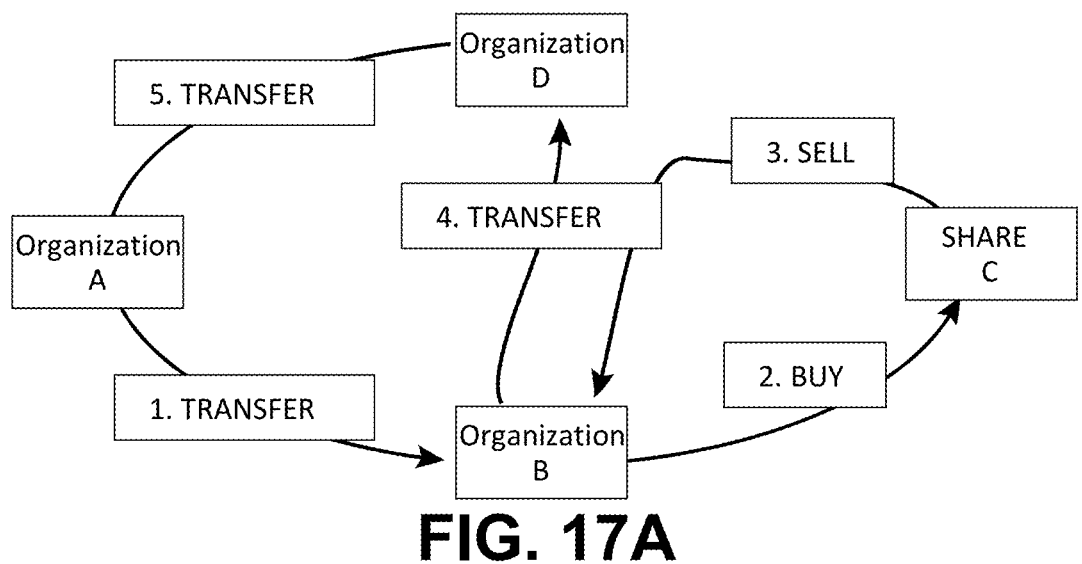
FIG. 17A shows example input data for an example application, in accordance with an embodiment.
Figure 17B:
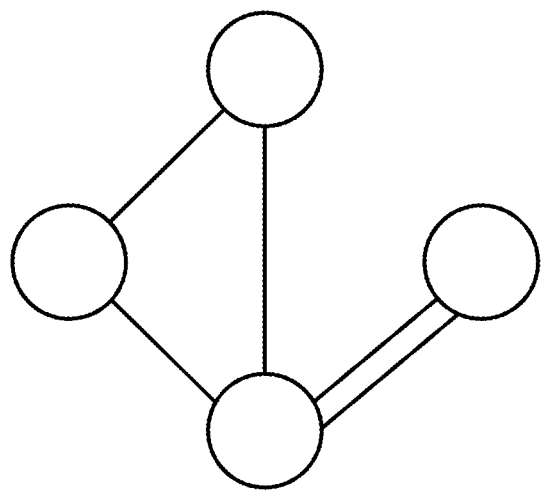
FIG. 17B shows a corresponding pattern for the example input data of FIG. 17A, in accordance with an embodiment.

Wealth Management: A graph of entities such as people or organizations buying/selling different types of securities is constructed. System 100 is applied to find entities holding similar portfolios or following similar investment strategies. Conveniently, in some embodiments, common behavioural trends of large groups can be established. FIG. 17A shows example input data for this example, while FIG. 17B shows the corresponding common pattern. FIG. 15 shows this common pattern used to identify entities exhibiting similar behaviour as defined in the common pattern.

Figure 17C:
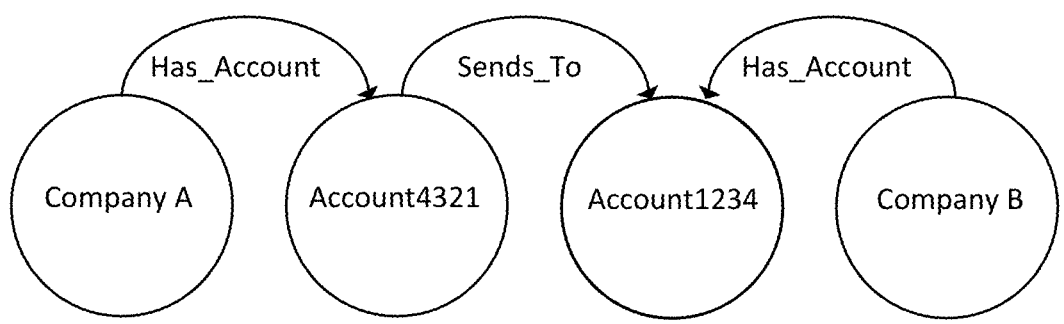
FIG. 17C shows an example graph structure relating to detecting money laundering, in accordance with an embodiment.

Detecting Money Laundering: System 100 may also be used to trace a chain of events as a behavioural pattern. For example, a chain of sell/buy/transfer events. Such information might be used for market analysis. Such information may be used to detect money laundering as shown in FIG. 17C (graph adapted from Investigating a money laundering scheme https://linkurio.us/blog/investigating-money-laundering-scheme/).

Credit Cards: For this example, a graph is constructed to interconnect people with businesses. System 100 classifies transactions into similar groups allowing for profiling of personal credit card activity with respect to geographical area, shopping habits, income level, etc. This may assist in evaluating the efficiency of credit card products with respect to certain client profiles. The optimal profiles are determined from the behavioural patterns established by system 100.

Retirement Sector: Different datasets reflecting a client's retirement activity can be merged, e.g., starting from explicit contributions to RRSP accounts to more implicit activities such as property market transactions and flights to retirement destinations such as Florida. All such relevant data can be used to construct a graph. System 100 identifies common groups sharing similar pre-retirement patterns as a factor of age and income level.

Figure 17D:
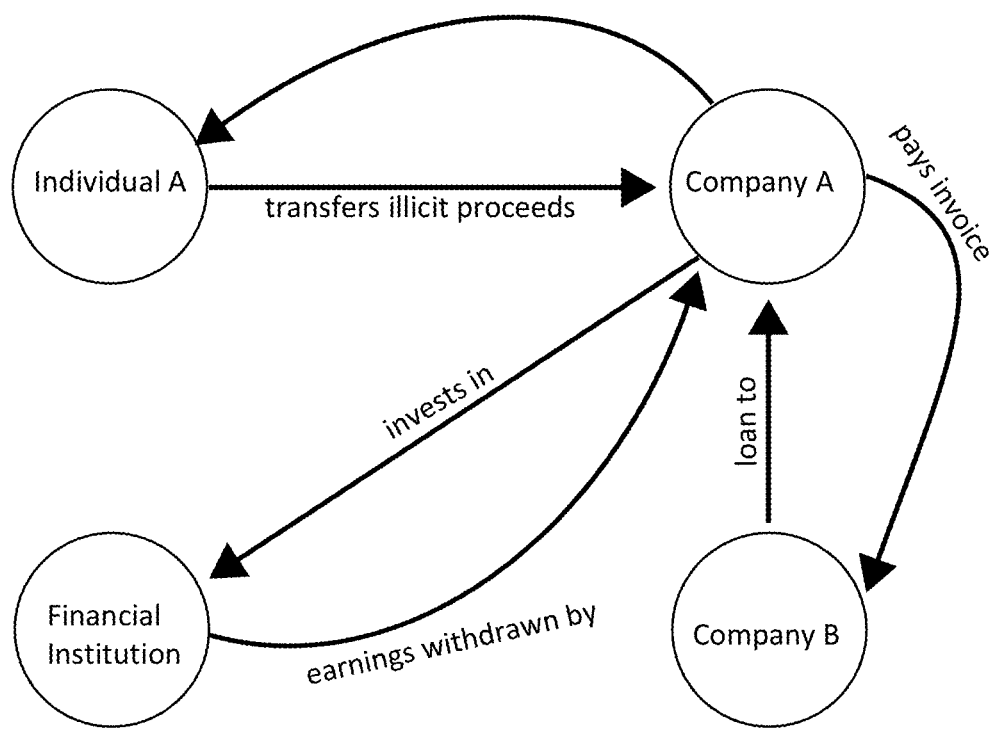
FIG. 17D shows an example graph structure relating to detecting fraud, in accordance with an embodiment.

AML and Fraud Detection: By mapping a transactional dataset into a graph, relationships among a group of two or more entities at a time can be analyzed. System 100 can be used to search, compare, and find repeated patterns of cash flows going through same institutions, accounts, customers and businesses. As an example, a common pattern can be constructed to find loop patterns where cash flow starts and ends at two financial institutions with the same owner, as shown for example in FIG. 17D (graph adapted from Graph Database Use Case: Fraud detection http://sparsity-technologies.com/blog/graph-database-use-case-fraud-detection-2/).

Figure 18:
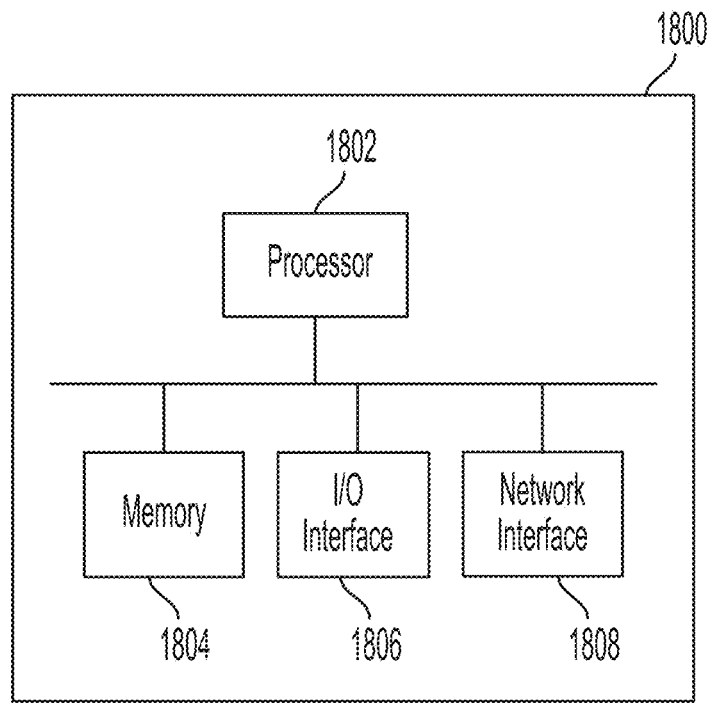
FIG. 18 is a schematic diagram of a computing device for implementing the pattern extraction system of FIG. 1, in accordance with an embodiment.

FIG. 18 is a schematic diagram of a computing device 1800 for implementing a pattern extraction system 100, in accordance with an embodiment. As depicted, computing device 1800 includes one or more processors 1802, memory 1804, one or more I/O interfaces 1806 and, optionally, one or more network interface 1808.

Each processor 1802 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 1804 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 1804 may store code executable at processor 1802, which causes device 1800 to implement the functionality of system 100, as disclosed herein.

Each I/O interface 1806 enables computing device 1800 to interconnect with one or more input devices, such as a keyboard, mouse, VR controller, camera, touch screen and a microphone, or with one or more output devices such as a display screen and a speaker.

Each network interface 1808 enables computing device 1800 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The methods disclosed herein may be implemented using a system that includes multiple computing devices 1800. The computing devices 1800 may be the same or different types of devices. Each computing devices may be connected in various ways including directly coupled, indirectly coupled via a network, and distributed over a wide geographic area and connected via a network (which may be referred to as "cloud computing").

For example, and without limitation, each computing device 1800 may be a server, network appliance, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the methods described herein.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The foregoing discussion provides many example embodiments. Although each embodiment represents a single combination of inventive elements, other examples may include all possible combinations of the disclosed elements. Thus, if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The embodiments and examples described herein are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A computer-implemented system for pattern extraction, the system comprising:
   at least one processor;
   memory in communication with the at least one processor, and
   software code stored in the memory, which when executed by the at least one processor causes the system to:
   generate a graph data structure reflective of a directed graph comprising:
   a plurality of vertices, each representative of a corresponding one of a plurality of entities; and
   a plurality of edges each representative of a relationship between two of the vertices;
   generate a subgraph data structure reflective of a plurality of subgraphs upon processing the graph data structure to decompose the directed graph into the plurality of subgraphs;
   generate a similarity matrix data structure by applying a graph kernel to obtain a subgraph similarity matrix including a plurality of entries, each entry providing a score of the similarity between two subgraphs from the plurality of subgraphs;
   generate a clustering data structure reflective of a plurality of groups of the plurality entities upon processing the similarity matrix data structure, wherein each subgraph in the clustering data structure is similar to at least one other subgraph in the clustering data structure within a predefined density threshold; and
   for at least a given group of the plurality of groups, generating a common pattern data structure corresponding to a subgraph that is similar to subgraphs in the given group.

2. The computer-implemented system of claim 1, wherein the clustering data structure is generated by applying spectral clustering.

3. The computer-implemented system of claim 2, wherein the applying spectral clustering includes computing a cluster spectral density.

4. The computer-implemented system of claim 1, wherein the clustering data structure is generated upon evaluating a compactness of candidate clusters.

5. The computer-implemented system of claim 4, wherein the compactness is evaluated upon computing a silhouette coefficient.

6. The computer-implemented system of claim 1, wherein the similarity matrix data structure is generated upon computing a graph kernel.

7. The computer-implemented system of claim 6, wherein the graph kernel comprises a Weisfeiler-Lehman kernel.

8. The computer-implemented system of claim 1, wherein the plurality of entities includes at least one of a business and an industry.

9. The computer-implemented system of claim 1, wherein the plurality of edges includes an edge representing a flow of value between entities connected by that edge.

10. The computer-implemented system of claim 1, wherein the graph data structure is generated to include a plurality of edge weights.

11. A computer-implemented method for pattern extraction, the method comprising:
    generating a graph data structure reflective of a directed graph comprising:
    a plurality of vertices, each representative of a corresponding one of a plurality of entities; and
    a plurality of edges each representative of a relationship between two of the vertices;
    generating a subgraph data structure reflective of a plurality of subgraphs upon processing the graph data structure to decompose the directed graph into the plurality of subgraphs;
    generating a similarity matrix data structure by applying a graph kernel to obtain a subgraph similarity matrix including a plurality of entries, each entry providing a score of the similarity between two subgraphs of the plurality of subgraphs;
    generating a clustering data structure reflective of a plurality of groups of the plurality entities upon processing the similarity matrix data structure, wherein each subgraph in the clustering data structure is similar to at least one other subgraph in the clustering data structure within a predefined density threshold; and
    for at least a given group of the plurality of groups, generating a common pattern data structure corresponding to a subgraph that is similar to subgraphs in the given group.

12. The computer-implemented method of claim 11, further comprising:
providing an identifier of at least one given entity represented by a vertex within the subgraphs in the given group.

13. The computer-implemented method of claim 11, wherein the graph data structure is a first data structure, and the method further comprising:
receiving a second graph data structure reflective of a directed graph differing from the directed graph of the first data structure by at least one vertex or at least one edge.

14. The computer-implemented method of claim 13, further comprising:
detecting, using the common pattern data structure, a subgraph within the second graph data structure that is similar to the subgraphs in the given group.

15. The computer-implemented method of claim 11, further comprising:
providing an identifier of at least one entity represented by a vertex within the detected subgraph.

16. The computer-implemented method of claim 11, wherein the generating the clustering data structure includes applying spectral clustering.

17. The computer-implemented method of claim 16, wherein the applying spectral clustering includes computing a cluster spectral density.

18. The computer-implemented method of claim 11, wherein the generating the clustering data structure includes evaluating a compactness of candidate clusters.

19. The computer-implemented method of claim 18, wherein the compactness is evaluated upon computing a silhouette coefficient.

20. The computer-implemented method of claim 11, wherein the generating the similarity matrix data structure includes computing a graph kernel.

21. The computer-implemented method of claim 20, wherein the graph kernel comprises a Weisfeiler-Lehman kernel.

22. A non-transitory computer-readable medium having stored thereon machine interpretable instructions which, when executed by a processor, cause the processor to perform a computer-implemented method for pattern extraction, the method comprising:
generating a graph data structure reflective of a directed graph comprising:
a plurality of vertices, each representative of a corresponding one of a plurality of entities; and
a plurality of edges each representative of a relationship between two of the vertices;
generating a subgraph data structure reflective of a plurality of subgraphs upon processing the graph data structure to decompose the directed graph into the plurality of subgraphs;
generating a similarity matrix data structure by applying a graph kernel to obtain a subgraph similarity matrix including a plurality of entries, each entry providing a score of the similarity between two subgraphs of the plurality of subgraphs;
generating a clustering data structure reflective of a plurality of groups of the plurality entities upon processing the similarity matrix data structure, wherein each subgraph in the clustering data structure is similar to at least one other subgraph in the clustering data structure within a predefined density threshold; and
for at least a given group of the plurality of groups, generating a common pattern data structure corresponding to a subgraph that is similar to subgraphs in the given group.

* * * * *